US009645641B2

(12) United States Patent
Lee et al.

(10) Patent No.: US 9,645,641 B2
(45) Date of Patent: May 9, 2017

(54) REFLECTION-BASED CONTROL ACTIVATION

(71) Applicant: Microsoft Corporation, Redmond, WA (US)

(72) Inventors: Byungjoo Lee, Seoul (KR); Masaaki Fukumoto, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/449,435

(22) Filed: Aug. 1, 2014

(65) Prior Publication Data

US 2016/0034030 A1 Feb. 4, 2016

(51) Int. Cl.

| G06F 3/041 | (2006.01) |
| G06F 3/01 | (2006.01) |
| G06K 9/00 | (2006.01) |
| G06F 3/0484 | (2013.01) |
| G06F 3/03 | (2006.01) |

(52) U.S. Cl.
CPC ............ *G06F 3/013* (2013.01); *G06F 3/011* (2013.01); *G06F 3/0304* (2013.01); *G06F 3/04842* (2013.01); *G06K 9/00248* (2013.01); *G06K 9/00288* (2013.01); *G06K 9/00335* (2013.01); *G06K 9/00604* (2013.01); *G06F 2203/0381* (2013.01)

(58) Field of Classification Search
CPC .......... G06F 21/32; G06F 21/36; G06F 3/013; G06F 21/31; G06K 9/00597; G06K 9/00604; G06K 9/00912; H04L 63/083; H04L 2463/082; H04L 63/0861; H04W 12/06

USPC .......... 382/100, 103, 115, 116, 117; 340/5.2, 340/5.22–5.24, 5.53, 5.54, 5.8–5.83; 902/5; 713/184
See application file for complete search history.

(56) References Cited

U.S. PATENT DOCUMENTS

| 6,088,018 A | 7/2000 | DeLeeuw et al. |
| 8,594,374 B1 | 11/2013 | Bozarth |
| 8,885,882 B1 * | 11/2014 | Yin ............................ G06F 3/00 382/103 |
| 9,083,532 B2 * | 7/2015 | Leddy ................... H04L 9/3226 |
| 2011/0273369 A1 | 11/2011 | Imai et al. |
| 2012/0243729 A1 * | 9/2012 | Pasquero ................ G06F 3/013 382/103 |

(Continued)

FOREIGN PATENT DOCUMENTS

EP 2525271 A2 11/2012

OTHER PUBLICATIONS

Anand, et al., "Beyond Touch: Natural Interactions Using Facial Expressions", In IEEE Consumer Communications and Networking Conference, Jan. 1, 2014, pp. 255-259.

(Continued)

*Primary Examiner* — Nelson Rosario
(74) *Attorney, Agent, or Firm* — Holzer Patel Drennan (57) ABSTRACT

An electronic device detects an object in a field of view of a camera and determines a position of a reflection of the object in a reflective surface of the electronic device as viewed from a defined observation point. When the electronic device detects selection input from a user, a control of the electronic device is activated based on an alignment between a location on a reflective surface of the electronic device and the reflection of the object on the reflective surface.

18 Claims, 10 Drawing Sheets

(56) References Cited

U.S. PATENT DOCUMENTS

| | | | |
|---|---|---|---|
| 2013/0162798 A1* | 6/2013 | Hanna | A61B 3/14 348/78 |
| 2013/0293456 A1 | 11/2013 | Son et al. | |
| 2013/0300650 A1 | 11/2013 | Liu | |
| 2013/0342672 A1 | 12/2013 | Gray et al. | |
| 2014/0152956 A1* | 6/2014 | Silva | A61B 3/111 351/204 |
| 2014/0164928 A1* | 6/2014 | Kim | G06F 3/017 715/728 |
| 2014/0313124 A1* | 10/2014 | Kim | G06F 3/013 345/156 |
| 2014/0354539 A1* | 12/2014 | Skogo | G06F 3/013 345/156 |
| 2015/0143538 A1* | 5/2015 | Tsou | H04L 63/083 726/28 |
| 2015/0149956 A1* | 5/2015 | Kempinski | G06F 3/017 715/784 |
| 2015/0227735 A1* | 8/2015 | Chappell | G06F 3/013 726/19 |

OTHER PUBLICATIONS

"Second Written Opinion Issued in PCT Application No. PCT/US2015/042550", Mailed Date: Jun. 29, 2016, 5 Pages.

International Preliminary Examining Authority, U.S. Patent and Trademark Office, International Preliminary Report on Patentability for PCT/2015/042550, mailed Oct. 14, 2016 11 pages.

International Searching Authority, U.S. Patent and Trademark Office, International Search Report for PCT/US2015/042550, dated Sep. 22, 2015, 4 pages.

International Searching Authority, U.S. Patent and Trademark Office, Written Opinion for PCT/2015/042550, mailed Sep. 29, 2015, 5 pages.

* cited by examiner

REFLECTION-BASED CONTROL ACTIVATION

BACKGROUND

Electronic devices utilize a variety of security mechanisms to prevent unauthorized data access. For example, some electronic devices include features that prompt a user to provide a passcode or pin before granting the user access to data stored on the device. Protecting pin confidentiality presents a number of challenges. For instance, users may readily forget pins or passcodes that are too long or complicated. While easier to remember, shorter pins are at risk of being "shoulder-hacked" by bystanders in plain view of the electronic device. For example, a bystander may gain knowledge of a security pin by discretely watching over a user's shoulder while the user enters a pin in a public place. Other image-based security technologies, such as retinal scanning and fingerprint detection, can be complicated to implement.

SUMMARY

Implementations described and claimed herein may address the foregoing by activating a user interface control based on an alignment between an image reflected on a reflective surface of an electronic device and a physical location on the reflective surface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
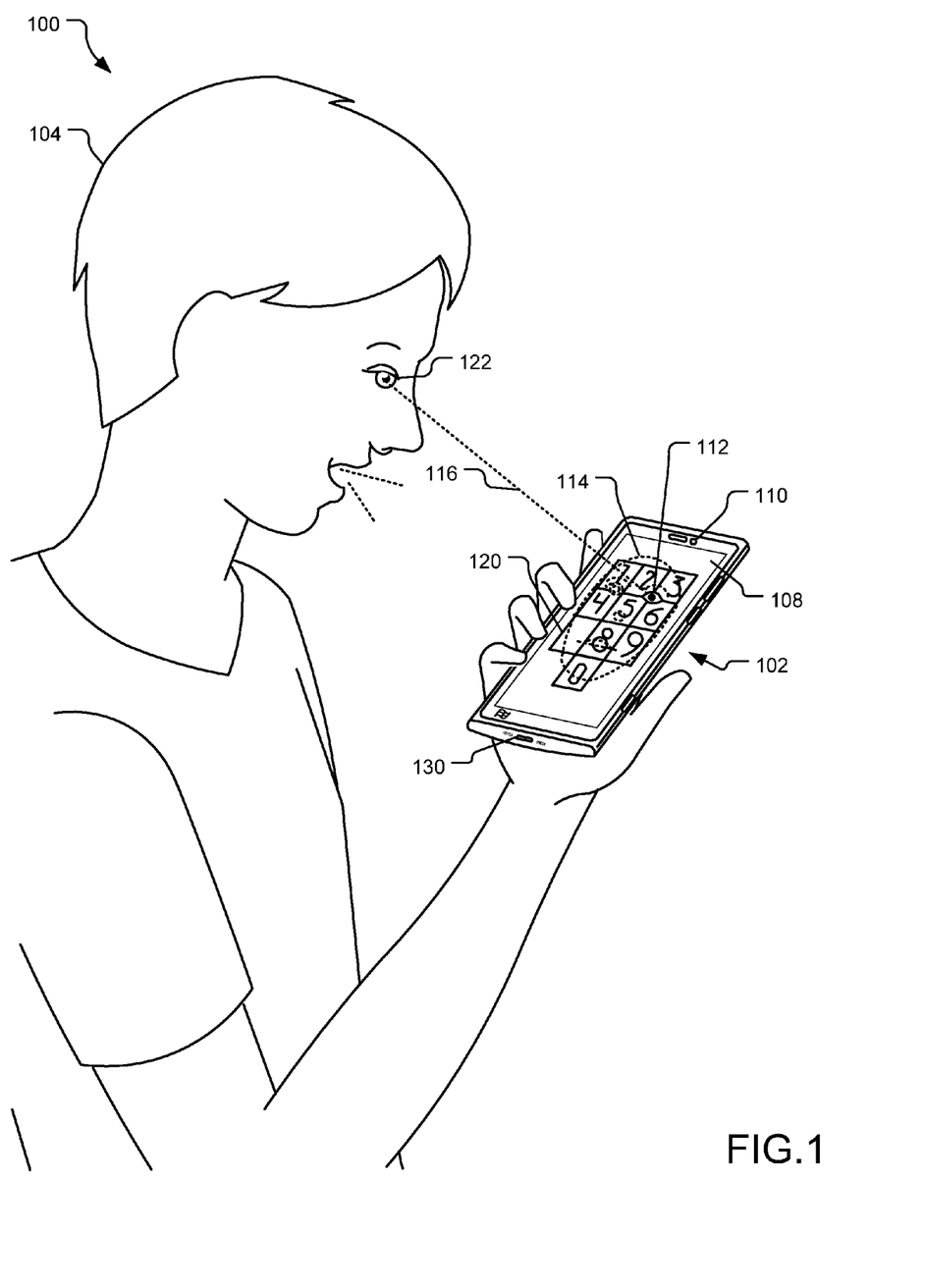
FIG. 1 illustrates an example system for actuating a control of an electronic device using a non-display cursor.

FIG. 1 illustrates an example system 100 for actuating a control of an electronic device 102 using a non-display cursor 112. The electronic device 102 may be, for example, a cellular phone (e.g., a smart phone), a tablet computer, a laptop, personal data assistant, gaming system, home security system, ATM, or any other electronic device with a reflective surface 108 (e.g., a display screen), and a sensor 110 (e.g., a camera) that collects information from the user environment. The electronic device 102 includes a feature utilizing a non-display cursor 112 that permits a user 104 to select a location on the reflective surface 108 to actuate a control of the electronic device 102. The non-display cursor 112 is not an image electronically generated by the electronic device 102 but rather a reflected image from a source external to the electronic device 102.

The non-display cursor 112 may be, for example, a reflected portion of a user's face, such as the user's eye, nose, mouth, etc. In FIG. 1, the non-display cursor 112 is a reflected image of the user's right eye 122. The apparent position of the non-display cursor 112 (e.g., the reflected image) relative to the reflective surface 108 is, at any given time, a variable position depending on the point of view of a given observer. The "actual" position of the non-display cursor is defined herein as a position relative to a single observation point 122. In FIG. 1, the observation point 122 is a dominant eye of the user 104. For example, the user 104 may view a position of the non-display cursor 112 on the reflective surface 108 by viewing the reflective surface with a dominant eye while keeping the non-dominant eye closed.

When the non-display cursor feature is initiated, the sensor 110 collects data from the environment external of the electronic device 102 in the direction of the user 104. The sensor 110 may be, for example, one or more camera sensors (e.g., CCD sensors) in a camera, IR sensors, depth sensors, RGB sensors, etc. In one implementation, the sensor 110 is a CCD sensor in a camera that continuously monitors the face of the user 104.

To actuate a control of the electronic device 102 using the non-display cursor 112, the user 104 holds the electronic device 102 such that the user 104 can see the non-display cursor 112 in the reflective surface 108. The user views the non-display cursor 112 with a dominant eye (e.g., an eye selected during device calibration), and orients the reflective surface 108 such that the non-display cursor 112 is, from the dominant eye perspective, aligned with a location on the reflective surface 108. In some applications, orienting the reflective surface 108 entails holding the electronic device 102 such that the user 104 can view the non-display cursor 112 and/or his reflection 114 in the reflective surface 108, as shown in FIG. 1. In other applications, the user 104 does not hold the electronic device 102. Rather, orienting the reflective surface 108 entails other adjustment actions, such as orienting the body of the user 104 relative to the reflective surface 108, or tilting the reflective surface 108 about one or more axes.

The user 104 performs a selection action to select a control displayed or viewable on the reflective surface 108 at a location aligned with the non-display cursor 112. A selection action may be, for example, an audible sound such as a short tongue click or voice command, a detectable movement such as an eye blink, lip motion, touchscreen input, etc. For example, the user 104 may desire to select the number '3' on a keypad 120 of the reflective surface 108. To do so, the user 104 orients the reflective surface 108 of the electronic device 102 such that the non-display cursor 112

(e.g., the reflected image of the user's left eye) hovers over the number '3' on a keypad 120. The user then selects the number '3' by performing a selection action while the alignment between the non-display cursor and the number '3' is maintained. The user may, for example, select the number '3' by making an audible noise detected by the microphone 130. Alternatively, the user may select the number '3' by tapping a region of the reflective surface 108 (e.g., if the reflective surface 108 is a touchscreen). A variety of other selection actions are also contemplated.

Responsive to detection of the selection action, the electronic device 102 uses data from the sensor 110 to determine the position of the non-display cursor 112 at the time of the selection action. As mentioned above, the position of the non-display cursor 112 is defined with respect to an observation point 122.

The electronic device 102 identifies which, if any, controls located on the reflective surface 108 include an area that aligns with (e.g., overlaps) the position of the non-display cursor 112, as viewed from the observation point 122 at the time of the selection action. This item is "selected" and used by the electronic device 102 to initiate one or more processing actions. The disclosed technology is contemplated for use in a variety of applications, including security applications requiring user authentication for access to certain applications, data access, and/or general utilization the electronic device 102. For example, the electronic device 102 may prompt the user 104 for an authentication sequence (e.g., a pin or passcode) to access data viewable from the electronic device 102. Because the locations(s) that the user selects with the non-display cursor 112 are not visible except along a line of sight 116 corresponding to the defined observation point 122 (e.g., the user's dominant eye), the user 104 can discretely enter the authentication sequence in a public place without risk of compromising the authentication sequence to others in plain view of the reflective surface 108. For example, the user 104 may enter a single digit authentication sequence by aligning the non-display cursor 112 and performing a selection action. The same or similar steps can be repeated to enter a multi-digit authentication sequence.

In some implementations, the reflective surface 108 does not display the keypad 120 while the user 104 provides input using the non-display cursor 112. For example, the user 104 may be able to use the non-display cursor 112 to select other controls or images displayed on the reflective surface 120 or to select portions of the reflective surface 120 that do not display any images at all.

The electronic device 102 may use a variety of techniques to identify the position of the non-display cursor 112 including, for example, pattern recognition techniques. For example, the sensor 110 may be a camera that collects image data from the user environment. The electronic device 102 may use one or more pattern recognition modules to recognize user facial features such as, for example, a facial center or an eye of the user. The electronic device 102 can then use other saved or dynamically determinable parameters (e.g., position information, depth estimates, etc.) to estimate a position where non-display cursor 112 appears on the reflective surface 108.

Figure 2:
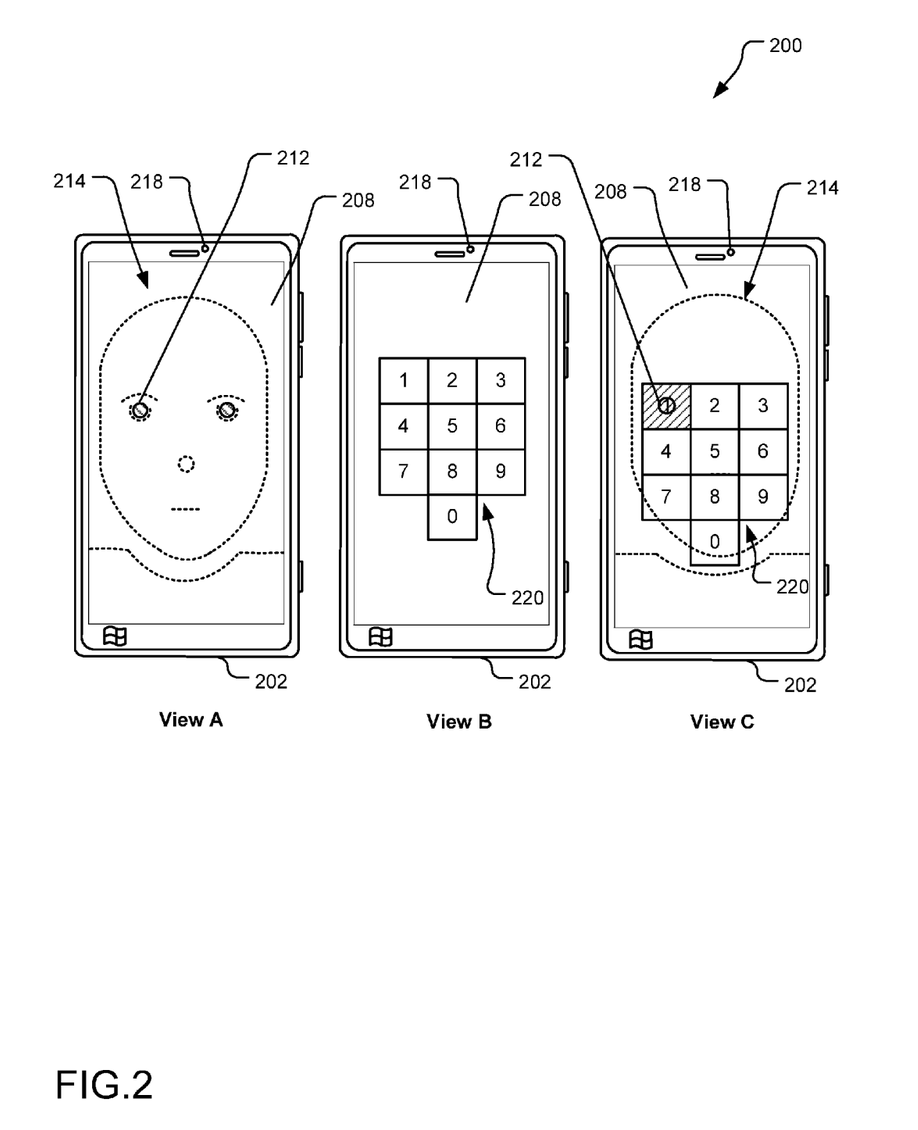
FIG. 2 illustrates an example use of a non-display cursor that actuates a control of an electronic device.

FIG. 2 illustrates an example system 200 including a non-display cursor 212 that actuates a control of an electronic device 202. The electronic device 202 includes a camera 218 that monitors a user (not shown) while a device feature utilizing a non-display cursor 212 prompts the user for input. When a reflective surface 208 (e.g., a display screen) of the electronic device 202 is oriented in a particular manner relative to the user, the user can see his facial reflection 214 on the reflective surface 208 (as shown in View A of FIG. 2).

During a calibration operation (e.g., as described below with respect to other figures), the user selects a facial feature to serve as a cursor source for the non-display cursor 212. The position of the non-display cursor 212 is defined as the position of the cursor source reflected in the reflective surface 208 when viewed from a defined observation point. For example, the observation point may be a dominant eye of the user. In FIG. 2, the user has defined his left eye to be the cursor source. Accordingly, the position of the non-display cursor 212 is given by the position of the user's left eye reflected in the reflective surface 208 as viewed along a line of sight of the user's dominant eye. In other implementations, the user can select other facial or body features to serve as the cursor source for the non-display cursor 112 such as, for example, the top of the user's nose, the center of the user's mouth, the user's index finger, etc.

View B of FIG. 2 illustrates a keypad 220 displayed on the reflective surface 208 of the electronic device 202. View C illustrates an alignment of the number '1' on the keypad 220 and the non-display cursor 212, as viewed from the defined observation point. While the alignment between the non-display cursor 212 and the number '1' is maintained, the user performs a selection action to select the number '1.' A selection action may be, for example, an audible sound (such as a short tongue click), an eye blink, lip motion, touch reflective surface input, etc.

Responsive to detection of the selection action, the electronic device 202 analyzes data collected by the camera 218 to identify the position of the non-display cursor 212 relative to the reflective surface 208. For example, the electronic device 202 may analyze an image of the user taken at the time of the selection action to determine a position of the cursor source within a field of view of the camera 218. In one implementation, this analysis compares a newly-taken image of the user with an image of the user previously taken during a calibration operation. The identified position of the cursor source within the field of view of the camera is mapped to a corresponding position in a line of sight from a defined observation point.

Determining the position of the non-display cursor 212 can be performed in a variety of different ways using a variety of techniques, including without limitation pattern recognition and/or Euclidean distance calculation techniques.

After determining the position of the non-display cursor 212, the electronic device 202 "selects" any content displayed or viewable in an area overlapping the position of the non-display cursor 212. This selection of content is received as input by one or more modules of the electronic device 202 and used to initiate one or more processing actions such as granting access to the electronic device 202, etc.

Figure 3:
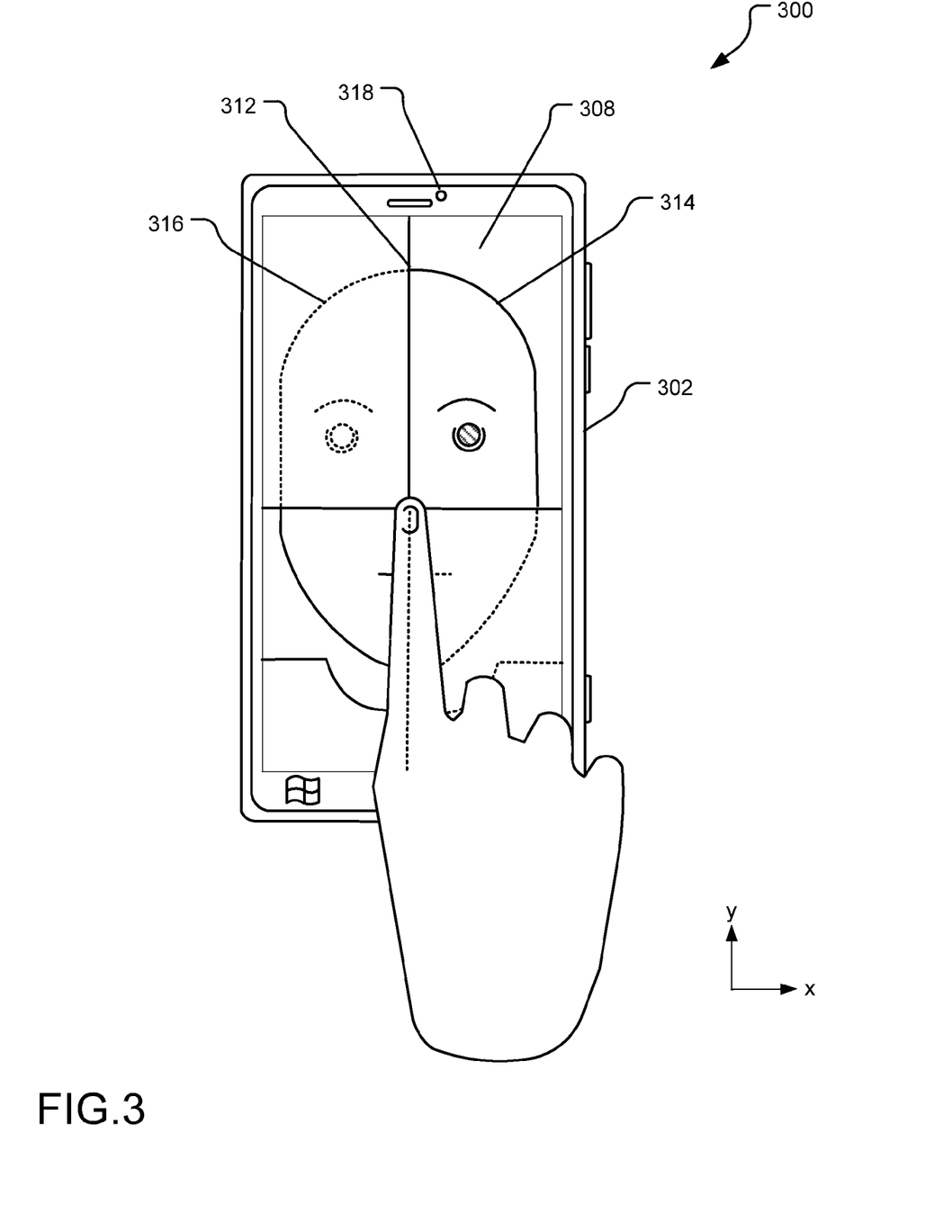
FIG. 3 illustrates an example environment for performing calibration operations of a non-display cursor feature of an electronic device.

FIG. 3 illustrates an example environment 300 for performing calibration operations of a non-display cursor feature of an electronic device 302. During the calibration operations 300, an image 314 of the user is taken with a camera 318 of the electronic device 302. The user provides the electronic device 302 with additional information for identifying a cursor source in a field of view of the camera 318 and mapping the apparent position of the cursor source to a position where a reflection of the cursor source appears on a reflective surface 308, as viewed from a defined observation point (e.g., the user's line of sight). In one implementation, the defined observation point corresponds to the line of sight of a selected dominant eye of the user.

When calibrating the non-display cursor feature of the electronic device 302, a user performs one or more of the below-described example calibration operations 300, either alone or in different combinations. In one example calibration operation, the electronic device 302 displays a real-time image of the user onto the reflective surface 308 and the user selectively re-orients the reflective surface 308 until a crosshairs 312 displayed on the reflective surface 308 aligns with a center of the real-time image of the user. When the user's "face center" aligns with the crosshairs 312, the user performs a selection action, and the camera 318 saves an image 314 of the user. The user can perform the selection action in a variety of ways, such as by touching a portion of the reflective surface 308 or making a noise detectable by a microphone of the electronic device 302 (e.g., a tongue "click" sound, a voice command, etc.). In this manner, the user provides the electronic device 302 with a reference point (e.g., the face center) that can be subsequently identified in other images of the user. For example, the electronic device 302 may use facial proportions of the image 314 to determine where this identified "face center" is positioned on other images of the user.

When using the non-display cursor feature, the user holds the electronic device 302 in a "natural holding position." The reflection 316 is an image viewable from the defined observation point when the user holds the electronic device 302 in the natural holding position. Notably, the position and orientation of the reflection 316 may vary from the position and orientation of the image 314. For example, the user may have centered the image 314 on the crosshairs 312 by extending his arm in an overly extended or un-relaxed manner. Therefore, alternative calibration operations permit the user to alter the image 314 to more closely resemble the reflection 316.

Figure 4:
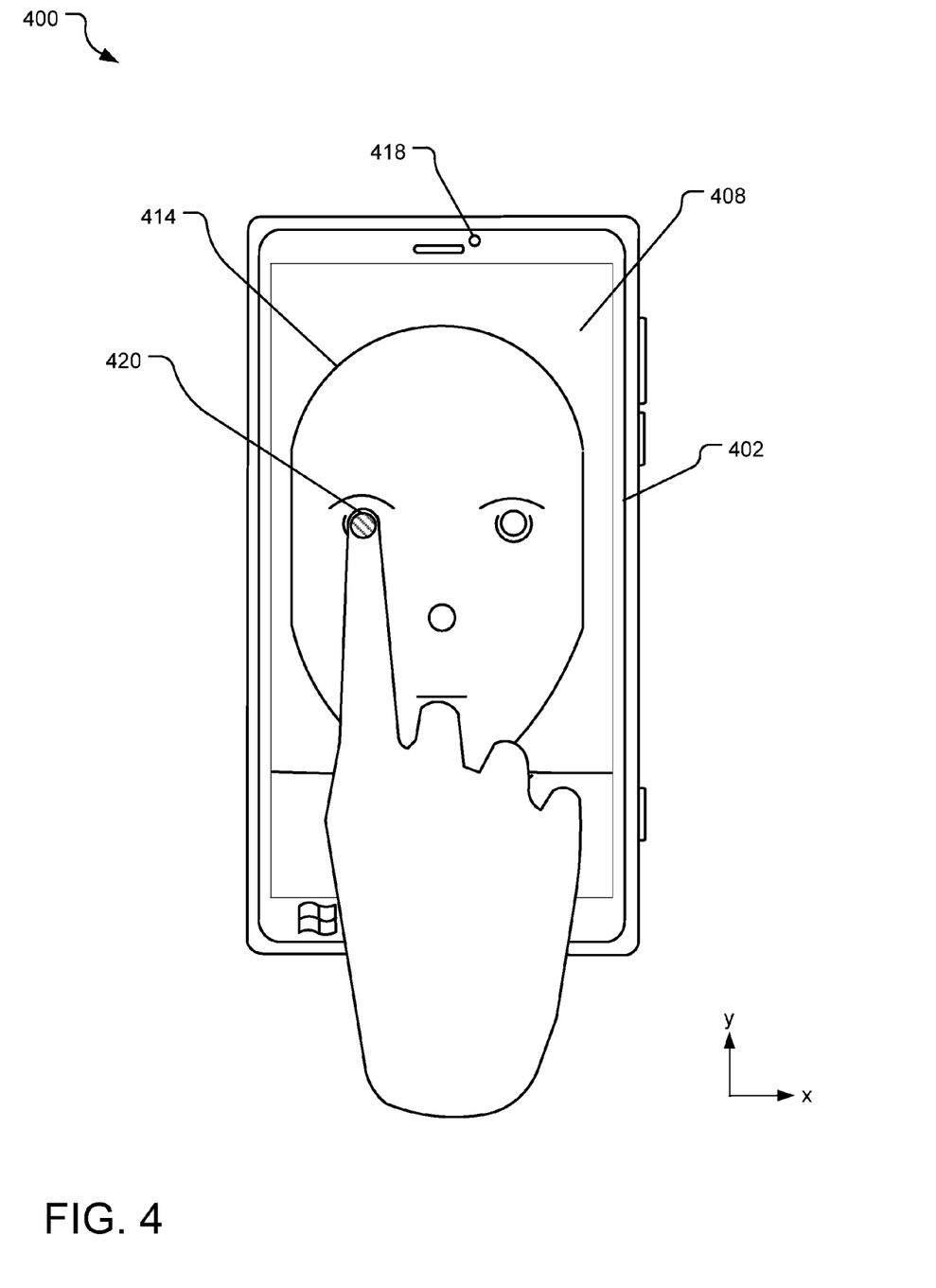
FIG. 4 illustrates another example environment for performing calibration operations of a non-display cursor feature of an electronic device.

In FIG. 3, the reflective surface 308 displays two quadrants of the image 314 centered on the crosshairs 312. In one example calibration, user holds the electronic device 302 in the natural holding position and observes the reflection 316 via the defined observation point (e.g., the dominant eye). If the center of the reflection 316 does not align with the center of the image 314, the user shifts the image 314 in one or more directions. For example, the user may drag a finger in a given direction across the reflective surface 308 to move the image 314 in that direction. Once this alignment of the two facial centers is achieved, the user provides input to confirm the repositioning of the image 314. For example, the user may provide input by touching a portion of the reflective surface (e.g., as shown in FIG. 4) or by making an audible noise detected by a microphone of the electronic device. This electronic device 302 uses this calibration to calculate a translation factor that is saved for subsequent use during operation of the non-display cursor feature.

In another example calibration operation, the user scales (e.g., changes the zoom-level) and/or rotates the image 314 relative to the reflected image 316. For example, the user may be able to provide touchscreen input to scale the image 314 (e.g., by using a finger pinching motion) or be able to rotate the image 314 (e.g., by rotating two touched fingers) so that the image 314 more closely resembles the reflection 316. After the user is finished manipulating the image 314 to align the image 314 with the reflection 316, the user provides input to confirm the rescaling of the image 314. The electronic device 302 uses this calibration to calculate a scaling factor that is saved for subsequent use during operation of the non-display cursor feature.

The user may be able to repeatedly adjust the translation and scale factors until both the image 314 and the reflection 316 are correctly aligned. After the user is finished manipulating the image 314, the electronic device 302 saves the scaling and translation factors for future use.

The above-described methodology (e.g., "repositioning" of the image 314) provides the electronic device 302 with a projection metric for projecting a reference point observed by the camera 318 to a position on the reflective surface 308 where the reference point appears when viewed from the defined observation point while the electronic device 302 is held in the natural holding position. If, for example, the electronic device 302 identifies a center of the user's face in a real-time image of the user, the electronic device 302 can use the saved scale and translation factors to calculate the projection metric and determine where the reflection of that facial center is positioned on the reflective surface 308 when viewed from the defined observation point.

FIG. 4 illustrates another example environment 400 for performing calibration operations of a non-display cursor feature of an electronic device 402. In FIG. 4, a user defines a cursor source 420 for a non-display cursor. In one implementation, the cursor source 420 is the user's dominant eye because it can be targeted easily; however, the cursor source 420 is, in other implementations, other parts of the user such as a nose, a mouth, finger, etc. The electronic device 402 displays an image 414 of the user on a reflective surface 408, and the user taps a reflected facial feature of the image 414 to select that feature as the cursor source 420. If, for example, the user taps the reflected image of his dominant (left) eye (as shown), the reflection of this eye becomes the non-display cursor during operation of the non-display cursor feature.

In another example calibration operation, the user controls a position marker on the reflective surface 408 (e.g., by dragging, pushing control buttons, etc.) and matches the position marker onto a reflected image of the cursor source 420 within the image 414. Once the position marker is aligned with the reflection of the cursor source 420, the user provides input to confirm the setting of the cursor source 420. For example, the user may provide input by touching a portion of the reflective surface (e.g., as shown in FIG. 4) or by making an audible noise detected by a microphone of the electronic device.

The electronic device 402 saves offset information that defines a separation between a defined reference point (e.g., an identified center of the user's face) and a position of the cursor source 420. Using this offset information, the electronic device 402 may later be able to identify the position of the cursor source 420 relative to an identified reference point in a real-time image taken by a camera 418. The electronic device 402 can then project the position of the cursor source 420 from the reference frame of the camera 418 into a reference frame of the user's dominant eye.

Figure 5A:
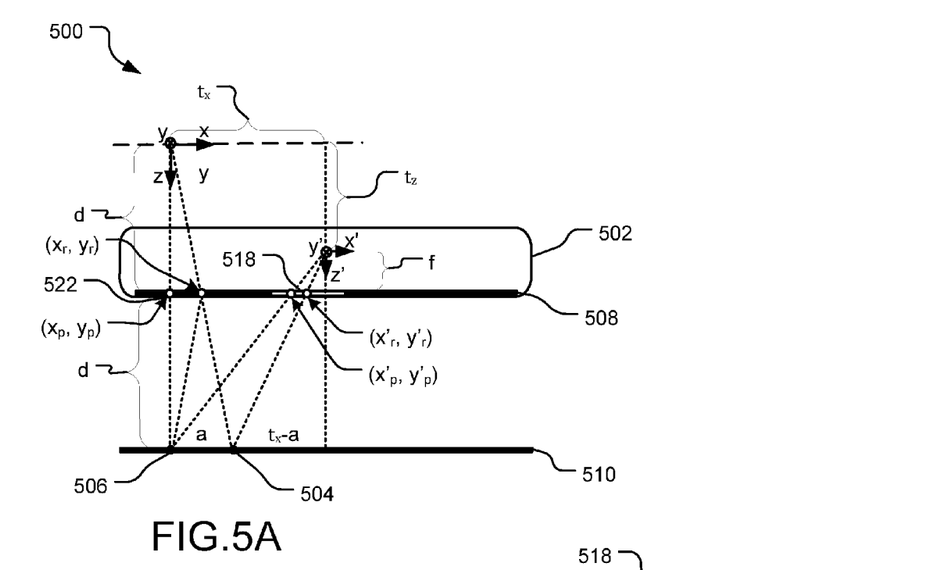
FIG. 5A illustrates an exemplary method for identifying a position of a non-display cursor on a reflective surface of an electronic device.
Figure 5B:
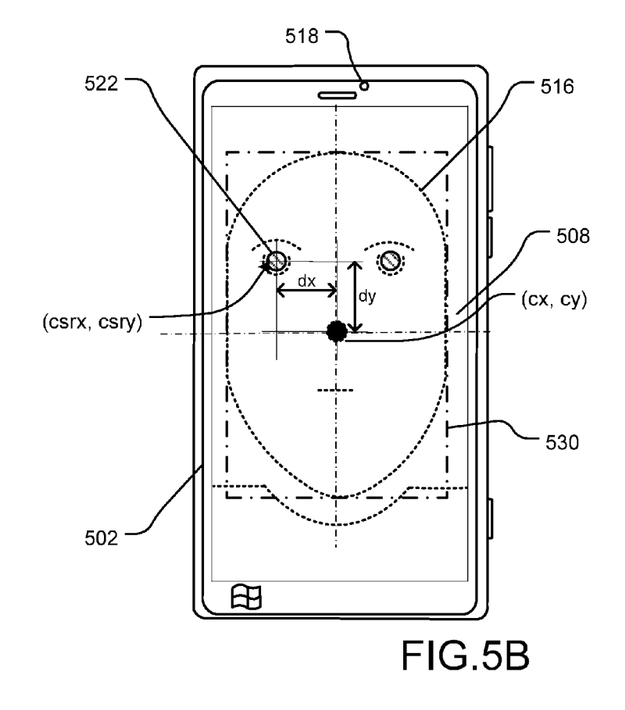
FIG. 5B further illustrates the exemplary method of FIG. 5A.

FIGS. 5A and 5B illustrate aspects of an exemplary method 500 for identifying a position of a non-display cursor on a reflective surface 508 of an electronics device 502. This method is just one of several suitable methods. During initial calibration, a user identifies a facial feature that acts as a cursor source 506 (e.g., the user's dominant (left) eye). The reflection of this feature acts as a non-display cursor 522 (e.g., as shown in FIG. 5B), and has a position that is defined relative to a specific observation point. In FIG. 5A-5B, and the observation point is a line of sight of a dominant eye of the user.

To utilize the non-display cursor feature, the user holds the electronic device 502 in a natural holding position so the user can view his reflection 516 in the reflective surface 508 (e.g., as shown in FIG. 5B). In the natural holding position, the cursor source 506 is at a distance 'd' from the reflective surface 508. The distance 'd' may be a parameter that is inferred, calculated, or estimated during prior or real-time calibration operations of the electronic device 502. An example real-time calibration step to identify "d" is described below with respect to FIG. 6. In other implementations, the distance 'd' is determined using a depth camera (not shown).

In the illustrated method, it is assumed that the user's face is flat (e.g., along a facial plane 510). In other implementations, more complex mathematics can be employed to account for z-direction topology differences along the surface of the user's face.

A first coordinate system (x, y, z), hereinafter the "dominant eye coordinate system," is defined to have an origin that sharing x and y coordinates with the cursor source 506 The origin of the first coordinate system is located at a point projected behind the reflective surface 508 by the distance 'd.' A second coordinate system (x', y', z') hereinafter the "camera coordinate system," is defined to have an origin sharing x and y coordinates with the camera 518. The origin of the second coordinate system is located at a point projected behind the reflective surface 508 by a distance 'f', where 'f' represents the focal length of the camera. The origin of the dominate eye coordinate system (x, y, z) is separated from the origin of the camera coordinate system (x', y', z') by a distance 't' where t=[$t_x$, $t_y$, $t_z$] and $t_z$=d−f. A reference point 504 is separated from the origin of the dominate eye coordinate system (x, y, z) by a distance 'a' where a[$a_x$,$a_y$,$a_z$]). The reference point 504 may be any feature, but is shown to be the center of the user's face in FIGS. 5A-5B. In this implementation, $a_z$=0 because the user's face is assumed to be flat.

A point ($x'_r$, $y'_r$) represents a position of the reference point 504 (e.g., the center of the user's face) on the reflective surface 508 within the camera coordinate system (x', y', z'). A point ($x'_p$, $y'_p$) represents a position of the cursor source 506 projected onto the reflective surface 508 within the camera coordinate system (x', y', x'). Another point ($x_p$, $y_p$) represents a position of the cursor source 506 reflected on the reflective surface 508 within the dominate eye coordinate system (x, y, z), while ($x_r$, $y_r$) represents a position of the reference point 504 reflected on the reflected surface 508 within the dominate eye coordinate system (x, y, z).

To compute the position ($x_p$, $y_p$) of the non-display cursor in the dominant eye coordinate system (x, y, z), the electronic device 502 can employ the following (exemplary) equations:

$$x_p = A_x x'_p + A_x x'_r + B_x \quad (1)$$

$$y_p = A_y y'_p + A_y y'_r + B_y \quad (2)$$

In equations (1) and (2) above, A=[$A_x$, $A_y$] represents a scaling factor, while B=[$B_x$, $B_y$] represent a translation factor. In one implementation, the translation factor (B) and scaling factor (A) are obtained in prior calibration processes, such as the translation and scaling factors discussed above with respect to FIG. 3. In one implementation, the scaling factor (A) and translation factor (b) are given by equations (3) and (4) below:

$$A = \frac{d(f+d)}{(f+d+t_z)} \quad (3)$$

$$B = \frac{da}{(f+d+t_z)} \quad (4)$$

Using these values for A and B, equations 1 and 2 can be transformed to equations (5) and (6) as follows:

$$x_p = \frac{d(f+d)x'_p}{f(f+d+t_z)} + \frac{d(f+d)x'_r}{f(f+d+t_z)} + \frac{da_x}{(f+d+t_z)} \quad (5)$$

$$y_p = \frac{d(f+d)y'_p}{f(f+d+t_z)} + \frac{d(f+d)y'_r}{f(f+d+t_z)} + \frac{da_y}{(f+d+t_z)} \quad (6)$$

During prior calibration processes, the electronic device 502 may also calculate and save an offset value (dx, dy) defining a separation between the reference point 504 and the cursor source 506 in the camera coordinate system (as shown in FIG. 5B).

During operation of the non-display cursor feature, the camera 518 records an image of the user while the user holds the electronic device 502 in the natural holding position. Modules of the electronic device use the recorded image to identify the reference point 504. When the reference point 504 is the center of the user's face (as in FIG. 5) the modules of the electronic device identify the reference point 504 by segmenting a facial region 530 in the recorded image and then identifying a facial center (e.g., a center of gravity) to define a value for the point $x'_r$, $y'_r$ in the camera coordinate system, represented as a point (cx, cy) in FIG. 5B.

Using the offset value (dx, dy) and the value (cx, cy), a value (csrx, csry) for the position of the non-display cursor source can be determined as follows:

$$csrx = A_x(dx+cx) + A_x(cx) + B_x \quad (7)$$

$$csry = A_y(dy+cy) + A_y(cy) + B_y \quad (8)$$

If the user's dominant eye is selected as the cursor source 522, the point (csrx, csry) is equal to ($x_p$, $y_p$) (as defined in equations (5) and (6) above).

During use of the non-display cursor feature, a distance "d" between the user's face and the reflective surface 508 may be different than such distance during initial calibration. In such case, additional real-time calibration adjustment can be performed to adjust the scaling factor A. One example real-time calibration is discussed with respect to FIG. 6, below.

Figure 6:
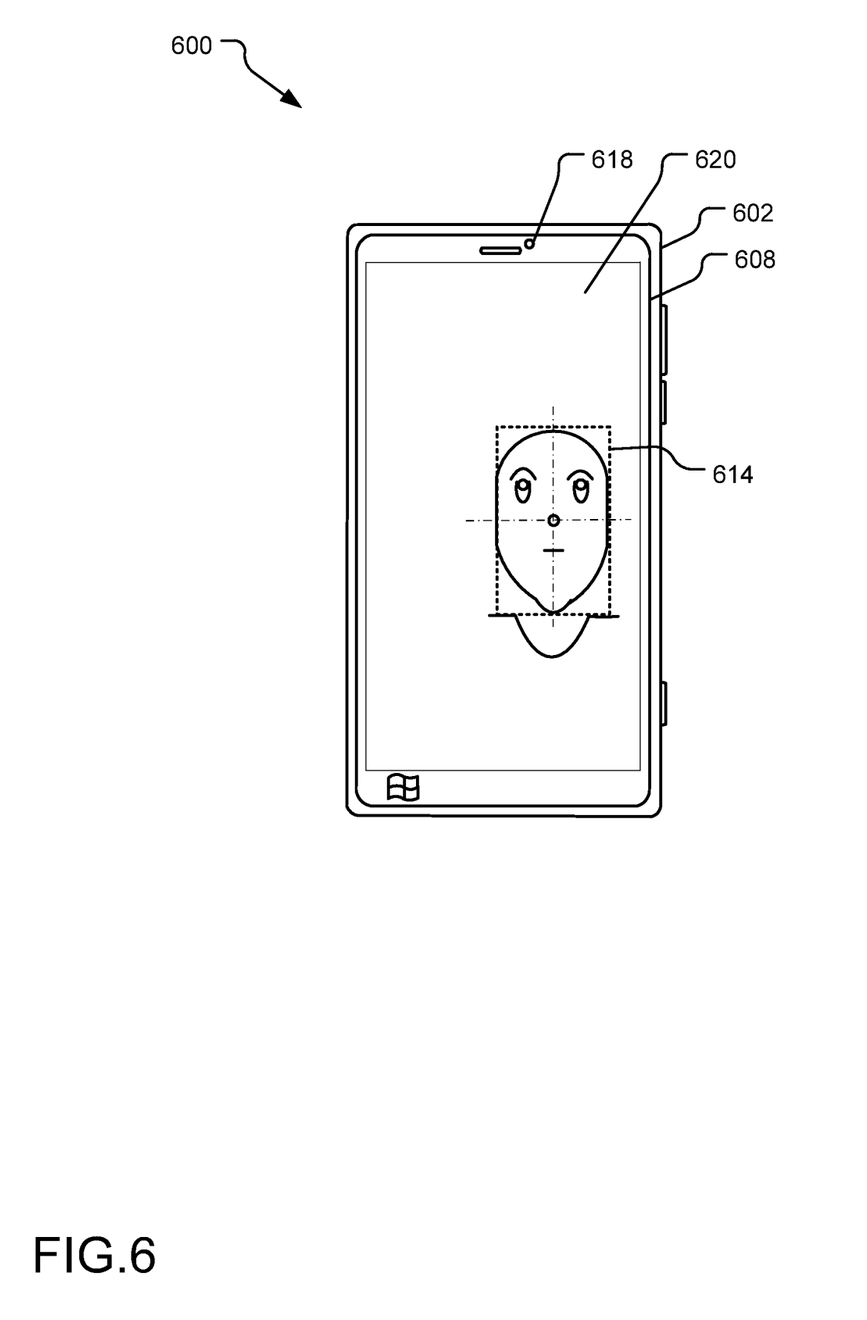
FIG. 6 illustrates an example real-time calibration operation usable to estimate distance between a user and a reflective surface of an electronic device.

FIG. 6 illustrates an example real-time calibration operation 600 usable to estimate distance between the user and a reflective surface 608 of an electronic device 602. A camera 618 on the electronic device 602 takes an image 614 of the user, such as upon initiation of a non-display cursor feature. In one implementation, the user holds the electronic device 602 in a natural holding position while the image 614 is taken. Modules of the electronic device 602 identify a boundary 620 of the user's face in the image 614.

The non-display cursor feature utilizes a scaling factor (A) that can be computed real-time as follows:

$$A = \frac{d(f+d)}{f(f+d+t_z)} = \frac{d(f+d)}{f(f+d+d-f)} = \frac{(f+d)}{2f} = A_o \frac{(f+d)}{(f+d_o)} \quad (9)$$

In equation (9), "$A_o$" is the originally-computed scaling factor (A), as in equations (1) and (2), based on an original calibration distance to the user '$d_o$.' The 'd' between the camera 618 and the user can be estimated using the following proportionality relation:

$$(f+d)\alpha \frac{1}{\sqrt{Face\_Area}} \quad (10)$$

Therefore, a real-time calibration of the constant 'A' can be determined as:

$$A = A_o \left( \frac{\sqrt{New\_Face\_Area}}{\sqrt{Initial\_Face\_Area}} \right) \quad (11)$$

where the "New_Face_Area" is the user's facial area determined in real-time and the "Initial_Face_Area" is the user's facial area determined during the initial calibration.

In other implementations, the distance 'd' is estimated by measuring facial width and/or facial height instead of facial area. By estimating the distance 'd' in this manner, the electronic device 602 can adjust the constant "A" used in equations (1) and (2) above, in order to compute the coordinates ($x_p$, $y_p$) of the non-display cursor.

In one implementation, a sensing device is used to directly measure the distance between the electronic device 602 and the user's face. For example, suitable sensing devices may include a depth camera or an ultrasonic/laser distance sensor.

On the other hand, the constant "B" appearing in equations 1 and 2, above, does not have to be re-calculated even when 'd' is altered because "B" can be solved for independent of distance, as shown by equation 12, below:

$$B = \frac{da}{(f+d+t_2)} = \frac{da}{(f+d+d-f)} = \frac{a}{2} \quad (12)$$

The above-described methodology makes some assumptions that can be corrected for in other implementations, such as implementations employing more complex mathematics. For example, the above methodology assumes that the reflective surface 508 is flat and roughly parallel to the plane of the user's face and that the user's face is also flat. Other implementations not described herein may account for rotation of the electronic device 502 relative to the facial plane 510 and/or rotation of the facial plane 510 relative to the reflective surface 508.

In another implementation (not shown), a different mathematical framework is employed to calculate the position of a non-display cursor in a system where the cursor source 506 is permitted to move (e.g., in the x-y plane) independent of the facial plane 510 and the reflective surface 508. For example, a gaming system may include one or more sensors that determine position and/or movement of a user relative to a receiving device. If the cursor source 506 is the user's hand, movement of the cursor source 506 is independent of the facial plane 510 and of a reflective surface 508 of the gaming system. In this case, a variety of equations and data collected from different sensors can be utilized to determine the position of the non-display cursor. Sensor technology that may be applicable in this and other implementations includes without limitation RGB sensors, depth sensors, thermal sensors, stereoscopic sensors, scanned laser sensors, ultrasound sensors, millimeter wave sensors, etc.

In one implementation, the non-display cursor feature allows a user to input a security pin to an ATM machine. Because ATM machines typically have large reflective surfaces and simplified keypads (e.g., 4 rows consisting of '123', '456', '789', and '0'), use of the non-display cursor feature may entail more dramatic, larger gestures than those generally sufficient to enter a pin on a mobile device, such as a cell phone. To increase security protection, ATM machines may implement the non-display cursor feature in conjunction with more complex keypads. For example, the keypad may consist of the following five rows: '1234567890', '4567890123', '7890123456', '0123456789', 3456789012').

Figure 7:
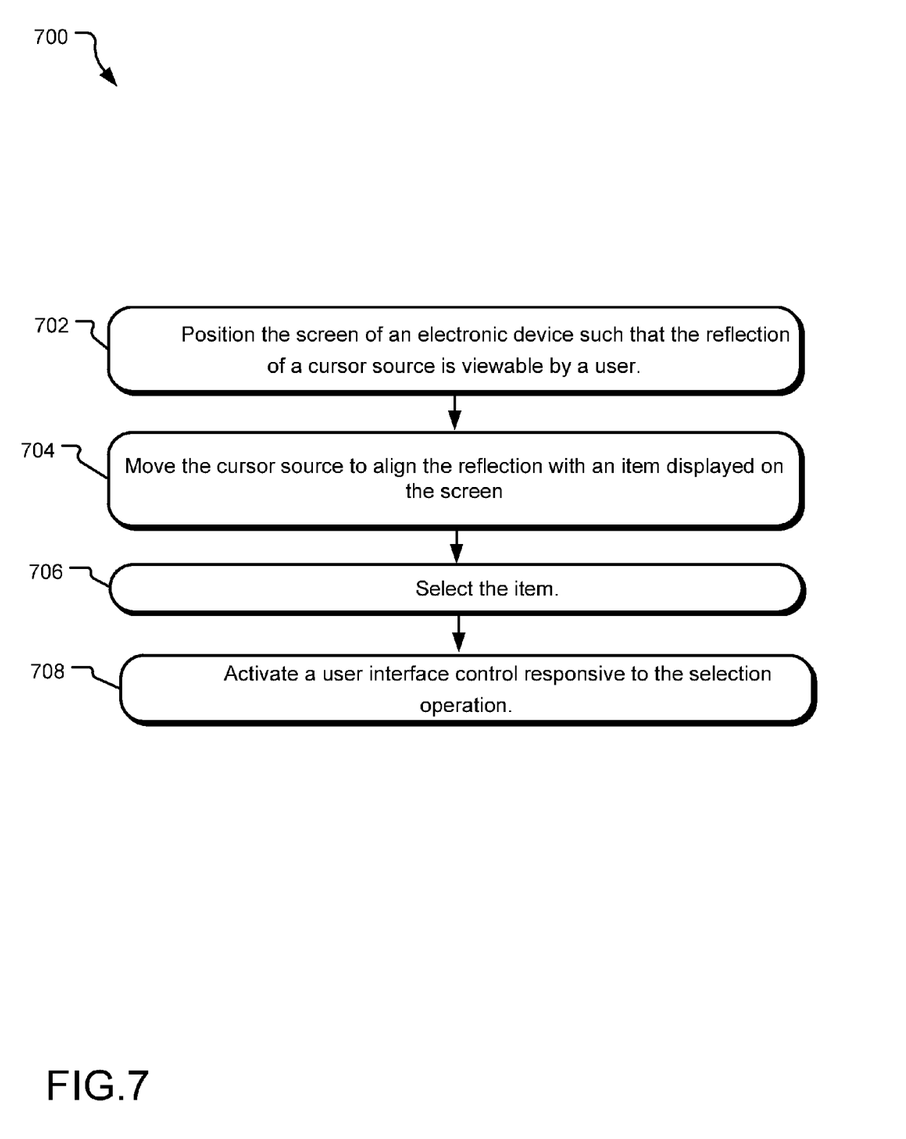
FIG. 7 illustrates example operations for using a non-display cursor feature of an electronic device.

FIG. 7 illustrates example operations 700 for using a non-display cursor feature of an electronic device. A positioning operation 702 positions the reflective surface of an electronic device such that the reflection of a cursor source (i.e., a non-display cursor) is viewable to a user. The cursor source may be, for example, a facial feature, body part, or other moveable object selected by the user, such as during a calibration operation. When reflected in the reflective surface of the electronic device, the cursor source acts as the non-display cursor. In one implementation where the electronic device is a hand-held device such as a tablet computer or mobile phone, the user performs the positioning operation 702 by orienting the electronic device so that a reflection of a cursor source is viewable from a defined observation point. In other operations where the electronic device is not hand-held, the user may perform the positioning operation 702 by adjusting the position of the reflective surface (e.g., if the device is mounted to a stationary surface), and/or by adjusting the position of his body.

A moving operation 704 moves the cursor source so that the non-display cursor overlaps an area on the reflective surface of the electronic device. A selection operation 706 selects makes a selection (e.g., a variable selection, item selection, etc.) based on the overlapped area. In one implementation, the selection operation 706 is performed by the user. The user provides selection input, such as by making an audible sound (such as a short tongue click), blinking an eye, moving lips, providing input to a touchscreen, etc. An activation operation 708 actuates a user interface control in response to the selection operation 706. For example, the activation operation 708 may provide the user with access to certain applications, data access, general utilization the electronic device, etc.

Figure 8:
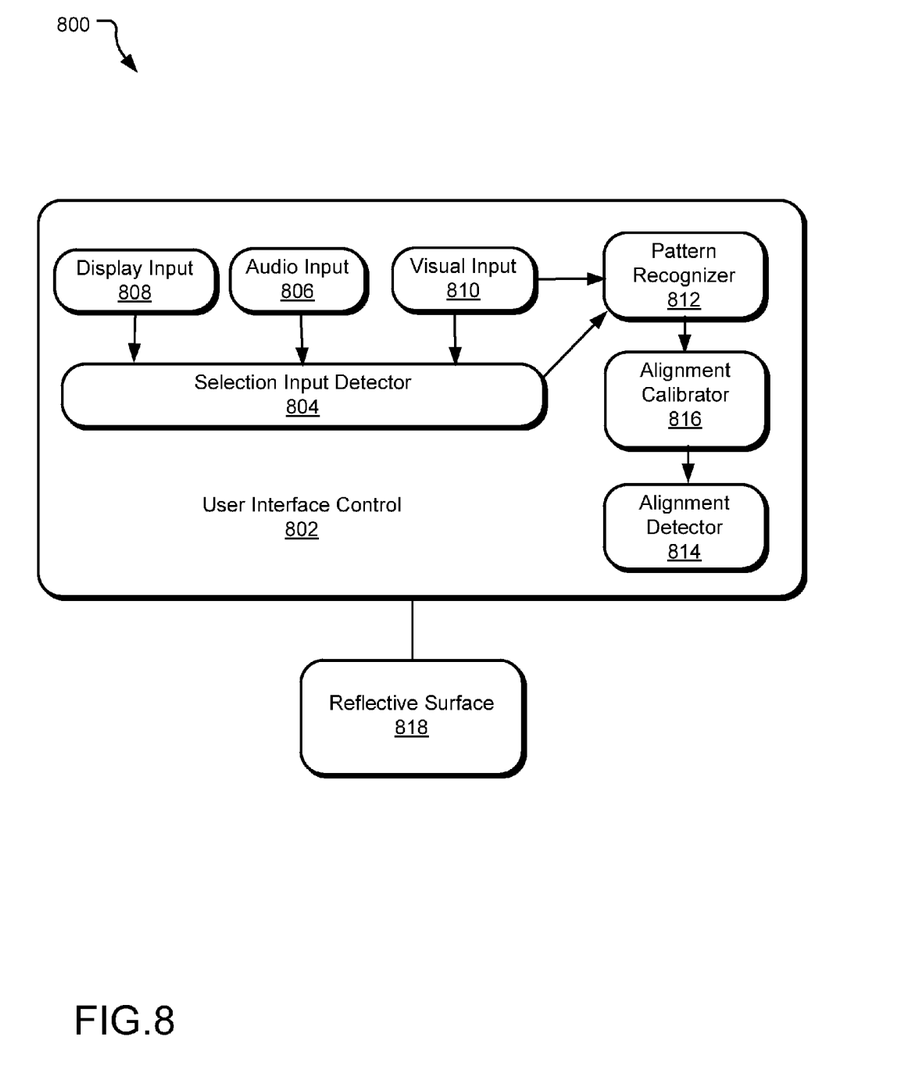
FIG. 8 illustrates an example user interface control for actuating a control of an electronic device using a non-display cursor.

FIG. 8 illustrates an example user interface control 802 for actuating a control of an electronic device 800 using a non-display cursor. The user interface control 802 accepts a variety of types of user input, including for example, display input 808 (e.g., touchscreen input), audio input 806 (e.g., via a microphone), and visual input 810 (e.g., via a camera or other image mapping sensor).

A selection input detector 804 detects a selection action performed by the user. In one implementation, the selection action is detected in the audio input 806, such as a verbal command, tongue "click," or other noise. In another implementation, the selection action is detected in the display input 808, such as via a tap on a touch screen of the electronic device 800. In still yet another implementation, the selection action is detected in the visual input 810, such as visual data from a camera and/or motion detector detecting movement of a user's mouth, eyes, or other body part.

The selection action indicates that the user has aligned a non-display cursor with a location on a reflective surface 818, and wishes to select a control displayed or viewable on the reflective surface 818 at the selected location. The user interface control 802 uses a variety of hardware and/or software mechanisms to identify this location on the reflective surface 818.

The selection input detector 804 instructs a pattern recognizer 812 to analyze the visual input 810 and to identify a reference point on an image of the user. For example, the pattern recognizer 812 may identify a facial region and further identify a user's eye, nose, facial center, etc. After the pattern recognizer 812 identifies the reference point, an alignment calibrator 816 compares the location of the reference point within the visual input 810 to the location of a corresponding reference point of a saved image. Via this comparison, the alignment calibrator 816 determines a scaling metric that accounts for shifts, scaling, and/or rotations that can be employed to make the visual input more closely resemble the saved image.

The alignment calibrator 816 provides an alignment detector 814 with the scaling metric and other saved offset information, and the alignment detector 814 identifies a position of a cursor source in a field of view of sensor(s) collecting the visual input 810. The alignment detector 814 projects the position of the cursor source into an alternate reference frame to determine the location where a reflection of the cursor source (i.e., the non-display cursor) appears on the reflective surface 818 along a user's line of sight.

Figure 9:
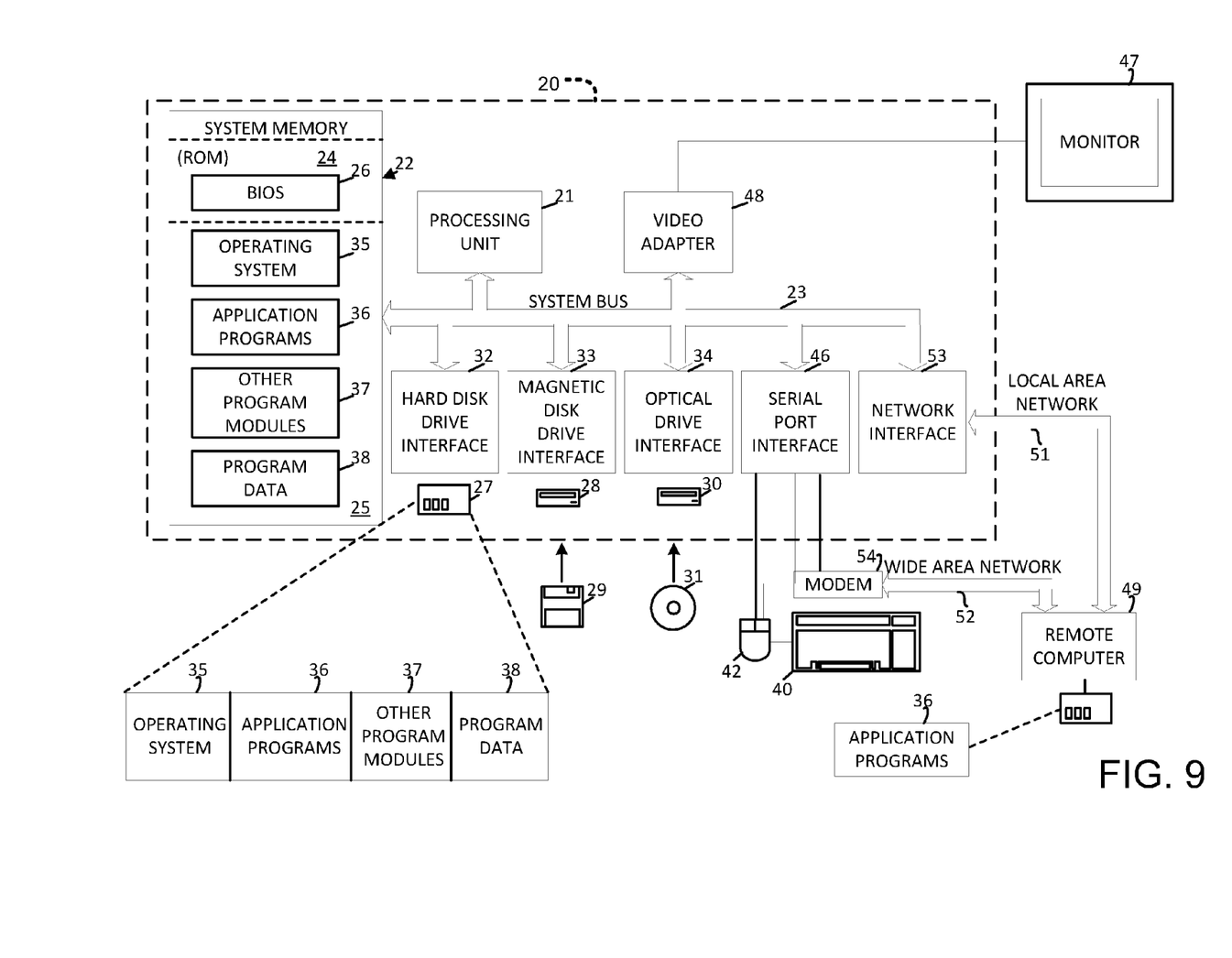
FIG. 9 illustrates an example system that may be useful in implementing the described technology.

FIG. 9 illustrates an example system that may be useful in implementing the described technology. The example hardware and operating environment of FIG. for implementing the described technology includes a computing device, such as general purpose computing device in the form of a gaming console or computer 20, a mobile telephone, a personal data assistant (PDA), a set top box, or other type of computing device. In the implementation of FIG. 9, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50. The logical connections depicted in FIG. 9 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, a selection input detector, a pattern recognizer, an alignment calibrator, an alignment detector, one or more pattern recognizers, detectors, calibrators, and other modules may be embodied by instructions stored in memory 22 and/or storage devices 29 or 31 and processed by the processing unit 21. Offsets, scaling metrics, various calibration data, camera data, display input data, audio input data, and other data may be stored in memory 22 and/or storage devices 29 or 31 as persistent datastores. Further, a user interface controller represents hardware and/or software configured to actuate one or more device controls based on user selection provided via a non-display cursor feature. The user interface controller may be implemented using a general purpose computer and specialized software (such as a server executing service software), a special purpose computing system and specialized software (such as a mobile device or network appliance executing service software), or other computing configurations.

The terms "module," "program," "service," and "engine" may be used to describe an aspect of computing system 20 that is implemented to perform one or more particular functions. In some cases, such a module, program, service, or engine may be instantiated via processing unit 21 executing instructions held by system memory 22. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

Figure 10:
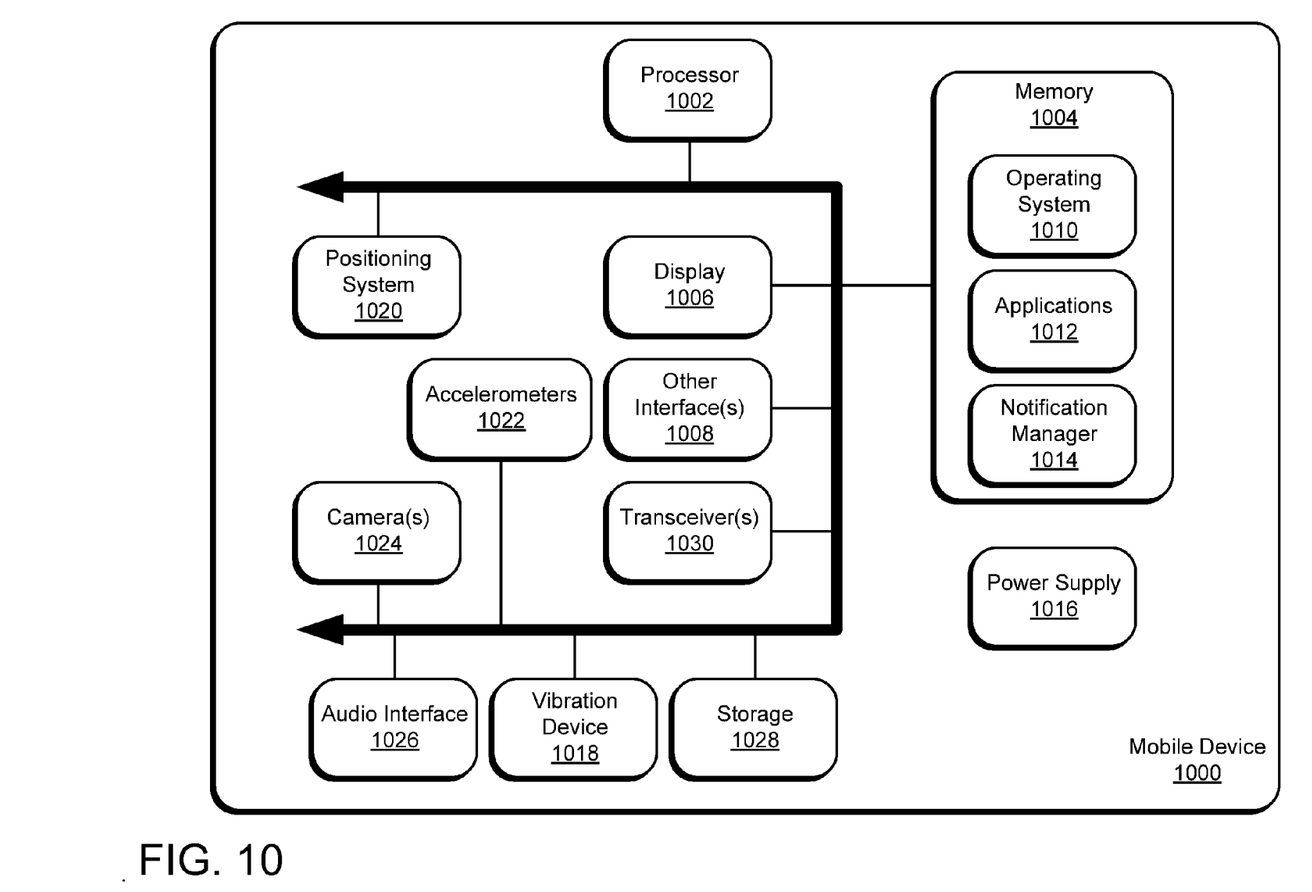
FIG. 10 illustrates another example system that may be useful in implementing the described technology.

FIG. 10 illustrates another example system (labeled as a mobile device 1000) that may be useful in implementing the described technology. The mobile device 1000 includes a processor 1002, a memory 1004, a display 1006 (e.g., a touchscreen display), and other interfaces 1008 (e.g., a keyboard). The memory 1004 generally includes both volatile memory (e.g., RAM) and non-volatile memory (e.g., flash memory). An operating system 1010, such as the Microsoft Windows® Phone operating system, resides in the memory 1004 and is executed by the processor 1002, although it should be understood that other operating systems may be employed.

One or more application programs 1012 are loaded in the memory 1004 and executed on the operating system 1010 by the processor 1002. Examples of applications 1012 include without limitation pattern recognition programs, calibration programs, etc. The mobile device 1000 includes a power supply 1016, which is powered by one or more batteries or other power sources and which provides power to other components of the mobile device 1000. The power supply 1016 may also be connected to an external power source that overrides or recharges the built-in batteries or other power sources.

The mobile device 1000 includes one or more communication transceivers 1030 to provide network connectivity (e.g., mobile phone network, Wi-Fi®, BlueTooth®, etc.). The mobile device 1000 also includes various other components, such as a positioning system 1020 (e.g., a global positioning satellite transceiver), one or more accelerometers 1022, one or more cameras 1024, an audio interface 1026 (e.g., a microphone, an audio amplifier and speaker and/or audio jack), and additional storage 1028. Other configurations may also be employed.

In an example implementation, a selection input detector, a pattern recognizer, an alignment calibrator, an alignment detector, one or more pattern recognizers, detectors, calibrators, and other modules may be embodied by instructions stored in memory 1004 and/or storage devices 1028 and processed by the processing unit 1002. Offsets, scaling metrics, various calibration data, camera data, display input data, audio input data, and other data may be stored in memory 1004 and/or storage devices 1028 as persistent datastores.

Mobile device 1000 and computer 20 (of FIG. 9) may include a variety of tangible computer-readable storage media and intangible computer-readable communication signals. Tangible computer-readable storage can be embodied by any available media that can be accessed by the mobile device 1000 or the computer 20 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device 1000 or computer 20. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A processor-implemented method comprising:
    displaying two or more user interface controls at an optically reflective surface of an electronic device;
    detecting an alignment between an optically reflected image optically reflected on the optically reflected surface of the electronic device and a physical location on the optically reflective surface at which a user interface control of the two or more user interface controls is displayed;
    detecting a selection action while the alignment is maintained at the physical location at which the user interface control is displayed; and
    activating the user interface control responsive to the detected alignment and the detected selection action.

2. The processor-implemented method of claim 1, wherein the selection action is a movement of the user.

3. The processor-implemented method of claim 1, wherein the selection action is detected by a microphone of the electronic device.

4. The processor-implemented method of claim 1, wherein the optically reflected image is a reflected part of the user.

5. The processor-implemented method of claim 1, wherein the optically reflected image includes a facial feature of the user.

6. The processor-implemented method of claim 1, wherein the electronic device is a mobile device.

7. The processor-implemented method of claim 1, wherein the alignment is achieved in a direction along a line of sight of the user.

8. The processor-implemented method of claim 1, wherein the perspective of the user is determined by a sensor on the electronic device.

9. An electronic system comprising:
   a display configured to display two or more user interface controls at an optically reflective surface of the electronic device;
   an alignment detector configured to detect an alignment between an optically reflected image optically reflected on the optically reflective surface of the electronic device and a physical location on the optically reflective surface at which a user interface control of the two or more user interface controls is displayed;
   a selection input detector configured to detect a selection action while the alignment is maintained at the physical location at which the user interface control is displayed; and
   a user interface controller configured to activate the user interface control responsive to the detected alignment and the detected selection action.

10. The electronic system of claim 9, wherein the selection action is a movement of the user.

11. The electronic system of claim 9, wherein the selection action is detected by a microphone of the electronic device.

12. The electronic system of claim 9, wherein the optically reflected image is a reflected part of the user.

13. The electronic system of claim 9, wherein the optically reflected image includes a facial feature of the user.

14. The electronic system of claim 9, wherein the electronic device is a mobile device.

15. The electronic system of claim 9, wherein the alignment is achieved in a direction along a line of sight of the user.

16. The electronic system of claim 9, wherein the perspective of the user is determined by a sensor on the electronic device.

17. One or more tangible computer-readable storage media encoding a computer program for executing a computer process on a computer system, the computer process comprising:
   displaying two or more user interface controls on a reflective surface of an electronic device;
   detecting an alignment between an optically reflected image optically reflected on the optically reflected surface of the electronic device and a physical location on the optically reflective surface at which a user interface control of the two or more user interface controls is displayed;
   detecting a selection action while the alignment is maintained at the physical location at which the user interface control is displayed; and
   activating the user interface control responsive to the detected alignment and the detected selection action.

18. The one or more tangible computer-readable storage media of claim 17, wherein the image optically reflected on the optically reflective surface and the physical location at which the user interface control is displayed are aligned along a line of sight of the user.

* * * * *